June 23, 1964    E. P. HITCHCOCK ETAL    3,137,933
METHOD OF REPAIRING A SEAL ASSEMBLY ON A WORN SHAFT
Filed Jan. 15, 1962
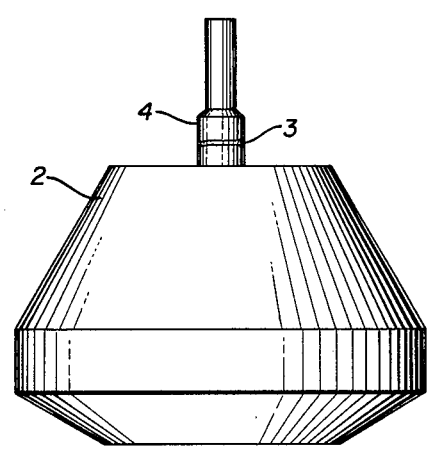
FIG. 1
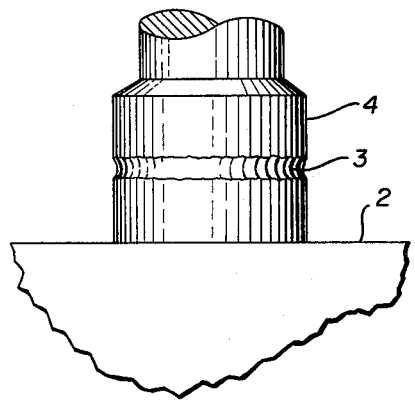
FIG. 4
FIG. 2
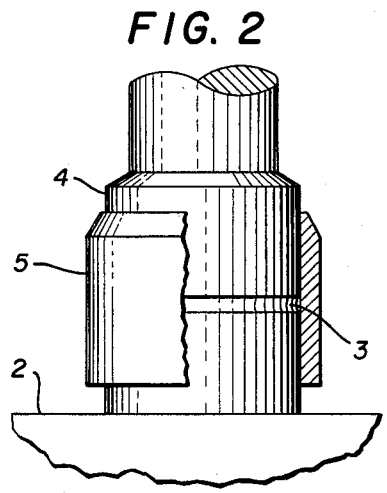
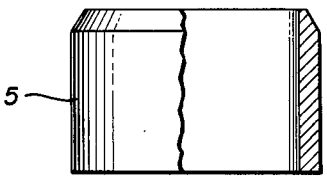
FIG. 3
FIG. 5
FIG. 6
INVENTORS
Elwyn P. Hitchcock
Claris L. Persons

3,137,933
Patented June 23, 1964

3,137,933
METHOD OF REPAIRING A SEAL ASSEMBLY ON A WORN SHAFT
Elwyn P. Hitchcock, 31 Church St., and Claris S. Persons, 31 Main St., both of Delevan, N.Y.
Filed Jan. 15, 1962, Ser. No. 166,435
1 Claim. (Cl. 29—401)

This invention relates to a new and useful improvement in the art of repairing a worn water seal assembly on a worn shaft.

The object of the invention is to replace and renew the water seal and seal contact surface.

The seal surface on the original spinner basket is non-replaceable.

In the drawings:

FIGS. 1 and 4 are side views of a spinner basket with FIG. 4 being an enlarged side view of the sealing surface damaged by wear.

FIG. 2 shows a view of the hard surfaced replacement sleeve installed on a damaged seal surface of the spinner basket.

FIGS. 3, 5 and 6 show replacement members comprising a hard surfaced sleeve to be installed over the original sealing surface, a water seal and capsule of sealant.

The spinner basket 2 in FIGS. 1, 2 and 4 has a groove 3 in FIGS. 1, 2 and 4 worn in the sealing surface 4 in FIGS. 1, 2 and 4. The hard surfaced replacement sleeve 5 in FIGS. 2 and 3 is provided with a tapered outer end which facilitates the assembly of the seal 6 in FIG. 5 over said sleeve. The sleeve is secured to the shaft by the use of a special sealant in a capsule 7 in FIG. 6.

We claim that this new and different method of repairing a water seal on a worn, damage seal contact surface of a washing machine shaft has never before been invented.

What is claimed is:

Method of repairing a water seal on a worn, damaged seal contact surface of a washing machine shaft comprising (1) installing a hard, surfaced sleeve, having a tapered outer end, over said worn, damaged seal contact surface of said shaft, (2) securing said hard surfaced replacement sleeve to the shaft by using a sealant, and (3) assembling a seal, having a tapered inner surface supported by a stainless steel finger spring, over the tapered end of the sleeve, thereby repairing the worn or damaged seal contact surface.

References Cited in the file of this patent
UNITED STATES PATENTS

| | | |
|---|---|---|
| 1,884,104 | Moore et al. | Oct. 25, 1932 |
| 2,262,210 | Stone | Nov. 11, 1941 |
| 2,378,525 | Abegg | June 19, 1945 |
| 2,405,541 | Gerner | Aug. 6, 1946 |